(12) United States Patent
Hong et al.

(10) Patent No.: US 9,921,447 B2
(45) Date of Patent: Mar. 20, 2018

(54) LIQUID CRYSTAL DISPLAY AND PANEL THEREFOR

(71) Applicant: Samsung Display Co., Ltd., Yongin (KR)

(72) Inventors: Sung-Kyu Hong, Seongnam (KR); Young-Chol Yang, Kunpo-si (KR); Jong-Lae Kim, Seoul (KR); Hee-Seob Kim, Hwasueong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 189 days.

(21) Appl. No.: 14/591,676

(22) Filed: Jan. 7, 2015

(65) Prior Publication Data

US 2015/0138482 A1     May 21, 2015

Related U.S. Application Data

(63) Continuation of application No. 13/241,647, filed on Sep. 23, 2011, now Pat. No. 8,953,113, which is a
(Continued)

(30) Foreign Application Priority Data

Mar. 26, 2003   (KR) ........................ 10-2003-0018787

(51) Int. Cl.
*G02F 1/1362*     (2006.01)
*G02F 1/1333*     (2006.01)
(Continued)

(52) U.S. Cl.
CPC ...... *G02F 1/136286* (2013.01); *G02F 1/1368* (2013.01); *G02F 1/13624* (2013.01);
(Continued)

(58) Field of Classification Search
CPC combination set(s) only.
See application file for complete search history.

(56) References Cited

U.S. PATENT DOCUMENTS

| 4,840,460 | A |   | 6/1989 | Bernot et al. |
| 5,151,689 | A | * | 9/1992 | Kabuto ................. G02F 1/1345 345/103 |

(Continued)

FOREIGN PATENT DOCUMENTS

| CN | 1132384 A | 10/1996 |
| CN | 1278073 A | 12/2000 |

(Continued)

OTHER PUBLICATIONS

International Preliminary Report for International Applicaiton No. PCT/KR2004/000685, dated Oct. 13, 2005.
(Continued)

*Primary Examiner* — Nathanael R Briggs
*Assistant Examiner* — Alexander Gross
(74) *Attorney, Agent, or Firm* — Cantor Colburn LLP

(57) ABSTRACT

The present invention provides a liquid crystal display having excellent visibility.

A thin film transistor array panel is provided, which includes: gate lines formed on an insulating substrate; data lines insulated from the gate lines and intersecting the gate lines; first pixel electrodes disposed on pixel areas defined by intersections of the gate lines and the data lines; first thin film transistors, each having three terminals connected to one of the gate lines, one of the data lines, and one of the first pixel electrodes; second pixel electrodes disposed on the pixel areas and capacitively coupled to the first pixel electrodes; and second thin film transistors, each having three
(Continued)

terminals connected to a previous gate line, a storage electrode line or one of the data lines, and one of the second pixel electrodes.

16 Claims, 15 Drawing Sheets

Related U.S. Application Data continuation of application No. 10/550,598, filed as application No. PCT/KR2004/000685 on Mar. 26, 2004, now Pat. No. 8,054,398.

(51) Int. Cl.
G02F 1/1368 (2006.01)
G02F 1/1343 (2006.01)

(52) U.S. Cl.
CPC .. *G02F 1/133345* (2013.01); *G02F 1/136227* (2013.01); *G02F 2001/134345* (2013.01); *G02F 2001/134354* (2013.01)

(56) References Cited

U.S. PATENT DOCUMENTS

| | | | |
|---|---|---|---|
| 5,283,566 A | 2/1994 | Mimura et al. | |
| 5,709,308 A | 1/1998 | Gics | |
| 5,777,700 A | 7/1998 | Kaneko et al. | |
| 5,946,067 A | 8/1999 | Kim et al. | |
| 6,104,450 A | 8/2000 | Hiraishi | |
| 6,147,722 A * | 11/2000 | Shimada | G02F 1/136227 349/123 |
| 6,229,589 B1 | 5/2001 | Koma | |
| 6,473,142 B2 | 10/2002 | Kim et al. | |
| 6,724,359 B2 | 4/2004 | Yamamoto et al. | |
| 6,760,082 B2 | 7/2004 | Lee | |
| 6,922,183 B2 | 7/2005 | Ting et al. | |
| 7,034,789 B2 | 4/2006 | Takeuchi et al. | |
| 7,113,159 B2 | 9/2006 | Sawabe | |
| 7,460,191 B2 | 12/2008 | Song | |
| 8,054,398 B2 | 11/2011 | Kim et al. | |
| 2001/0046003 A1 | 11/2001 | Song | |
| 2001/0050730 A1 * | 12/2001 | Tsukao | G02F 1/1362 349/54 |
| 2002/0047818 A1 * | 4/2002 | Yamamoto | G09G 3/342 345/87 |
| 2002/0070905 A1 | 6/2002 | Kodate et al. | |
| 2002/0089813 A1 | 7/2002 | Yamamoto et al. | |
| 2002/0140896 A1 * | 10/2002 | Lee | G02F 1/136259 349/192 |
| 2003/0058394 A1 | 3/2003 | Wu et al. | |
| 2003/0071930 A1 * | 4/2003 | Nagahiro | G02F 1/136213 349/39 |

FOREIGN PATENT DOCUMENTS

| | | |
|---|---|---|
| CN | 1290920 | 4/2001 |
| CN | 1346450 | 4/2002 |
| JP | 07013191 A | 1/1995 |
| JP | 798461 | 4/1995 |
| JP | 996835 | 4/1997 |
| JP | 10142577 | 5/1998 |
| JP | 10161084 | 6/1998 |
| JP | 10268349 A | 10/1998 |
| JP | 200019559 | 7/2000 |
| JP | 2001235752 | 8/2001 |
| JP | 2002258307 | 9/2002 |
| WO | 0140857 A1 | 6/2001 |

OTHER PUBLICATIONS

Written Opinion of the International Searching Aurhority for Intarnational Application No. PCT/KR2004/000685, dated May 29, 2004.

* cited by examiner

LIQUID CRYSTAL DISPLAY AND PANEL THEREFOR

TECHNICAL FIELD

The present invention relates to a liquid crystal display and a panel therefor.

BACKGROUND ART

A typical liquid crystal display ("LCD") includes an upper panel provided with a common electrode and color filters, a lower panel provided with thin film transistors ("TFTs) and pixel electrodes, and a liquid crystal layer is interposed therebetween. The pixel electrodes and the common electrode are applied with different electric voltages to generate electric field, thereby changing the orientations of liquid crystal molecules and thus the transmittance of light passing through the liquid crystal layer. As a result, the LCD displays desired images.

However, the LCD has gray inversion that the luminances between grays are reversed and lateral gamma curve distortion that a lateral gamma curve does not coincide with a front gamma curve, thereby exhibiting inferior visibility at left and right view. For example, the luminance increases and the color moves into white as goes toward the lateral side. In particular, the luminance difference between bright grays disappears such that the image is not clear. In the meantime, the recent employment of the LCD at multimedia increasingly requires good visibility for viewing pictures and moving pictures.

BRIEF DESCRIPTION OF THE DRAWINGS

The present invention will become more apparent by describing embodiments thereof in detail with reference to the accompanying drawings in which.

DETAILED DESCRIPTION OF THE INVENTION

Technical Problem

Figure 1:
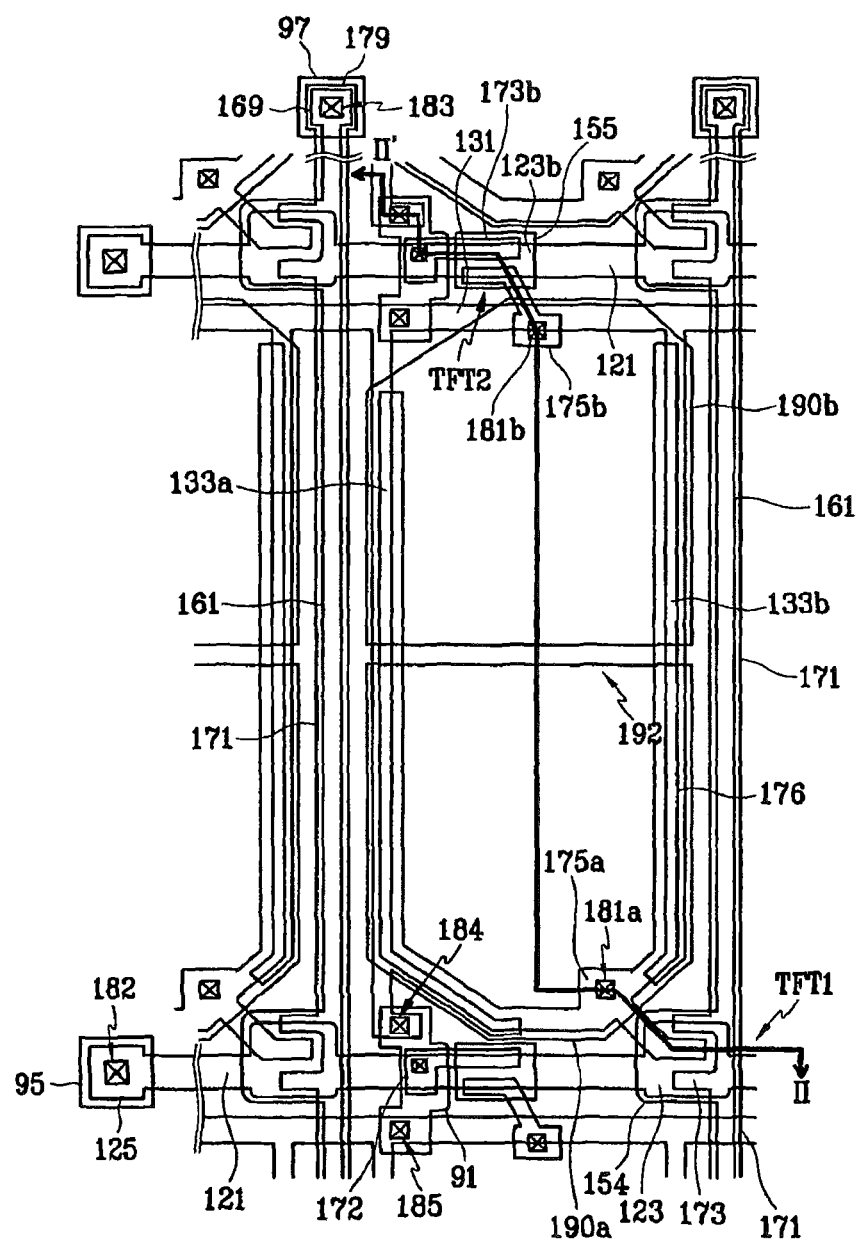
FIG. 1 is a layout view of a TFT array panel for an LCD according to a first embodiment of the present invention.

A motivation of the present invention is to provide a liquid crystal display having excellent visibility.

Technical Solution

Based on the motivation, the present invention divides a pixel electrode into two sub-electrodes and applies different voltages to the sub-electrodes.

In detail, a thin film transistor array panel according to an embodiment of the present invention includes a plurality of first signal lines and a plurality of second signal lines insulated from the first signal lines and intersecting the first signal lines formed on the insulating substrate. A plurality of first pixel electrodes are disposed on pixel areas defined by intersections of the first signal lines and the second signal lines and arranged in a matrix and a plurality of first thin film transistors, each having three terminals connected to one of the first signal lines, one of the second signal lines, and one of the first pixel electrodes, are formed thereon. A plurality of second pixel electrodes are disposed on the pixel areas and capacitively coupled to the first pixel electrodes, and a plurality of second thin film transistors are formed thereon. Each of the second thin film transistors have a terminal connected to one of the second pixel electrodes and another terminal connected to one of the first signal lines that is connected to one of the first pixel electrodes in a pixel area in an adjacent row.

The thin film transistor array panel may further include a plurality of coupling electrodes that are connected to or overlapping the first pixel electrodes and overlap the second pixel electrodes with being insulated therefrom. The coupling electrodes are preferably connected to drain electrodes of the first thin film transistors connected to the first pixel electrodes.

The thin film transistor array panel may further include a plurality of third signal lines intersecting the second signal lines, wherein a final terminal of each of the second thin film transistors is connected to one of the third signal lines and the second signal lines.

The final terminal of each of the second thin film transistors may be connected to one of the third signal lines, and the thin film transistor array panel may further include a plurality of third thin film transistors, each having three terminal connected to one of the second signal lines, one of the second pixel electrodes, and one of the first signal lines connected to a pixel area in an adjacent row.

At least one of the first pixel electrodes and the second pixel electrodes includes at least one domain partitioning member. The thin film transistor array panel may further include a gate insulating layer disposed between the first signal lines and the second signal lines, and a passivation layer disposed between the second signal lines and the first and the second pixel electrodes, wherein the coupling electrodes are preferably connected to the first pixel electrodes through contact holes at the passivation layer.

The thin film transistor array panel according to embodiments of the present invention is used for a panel for a liquid crystal display.

Advantageous Effect

A viewing angle of an LCD is enlarged by improving lateral visibility.

Best Mode of Embodiments

The present invention now will be described more fully hereinafter with reference to the accompanying drawings, in which embodiments of the inventions invention are shown. The present invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

Then, liquid crystal displays and thin film transistor panels therefor according to embodiments of this invention will be described in detail with reference to the accompanying drawings.

Figure 2:
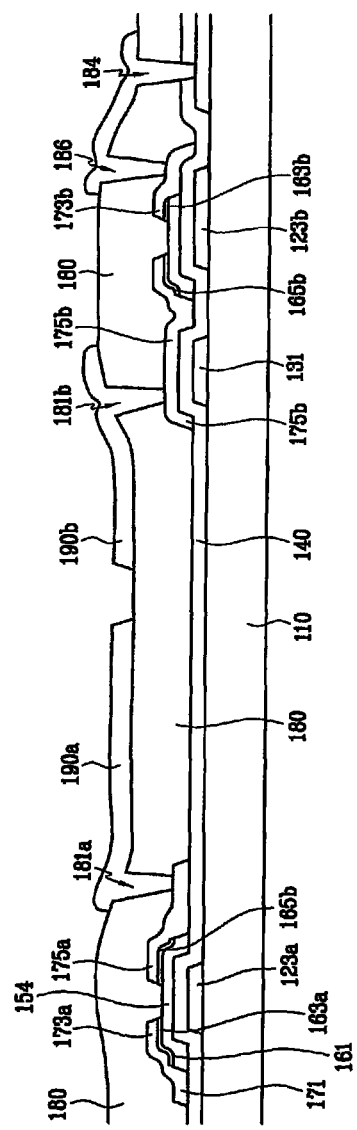
FIG. 2 is a sectional view of the ITT array panel shown in FIG. 1 taken along the line II-II'.
Figure 3:
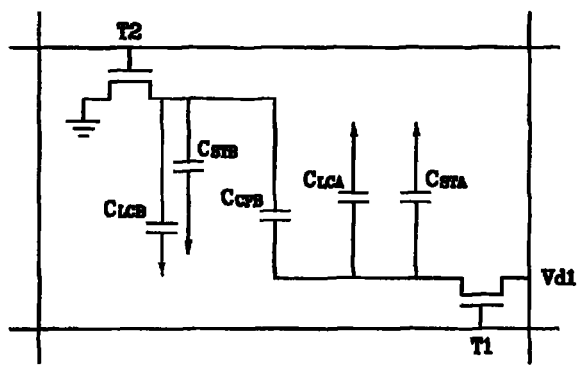
FIG. 3 is an equivalent circuit diagram of an LCD according to the first embodiment of the present invention.

FIG. 1 is a layout view of a TFT array panel for an LCD according to a first embodiment of the present invention, FIG. 2 is a sectional view of the TFT array panel shown in FIG. 1 taken along the line II-II', and FIG. 3 is an equivalent circuit diagram of an LCD according to the first embodiment of the present invention.

An LCD according to an embodiment of the present invention includes a lower panel (i.e., a TFT array panel), an upper panel (i.e., an opposite panel) facing the lower panel, and a liquid crystal layer interposed between the two panels and including liquid crystal molecules aligned in a twisted nematic mode such that they are twisted from the lower panel to the upper panel.

First, the lower panel is described.

A plurality of first and second pixel electrodes 190a and 190b preferably made of transparent conductive material such as ITO (indium tin oxide) and IZO (indium zinc oxide) are formed on an insulating substrate 110 preferably made of transparent insulating material such as glass. Each of the first pixel electrodes 190a is connected to a first thin film transistor TFT1 and receives image signal voltages therefrom, and each of the second pixel electrodes 190b is connected to a second thin film transistor TFT2 that is electrically connected to a previous gate line 121 for transmitting gate signals or scanning signals to a previous pixel row and to a storage electrode line 131. The second pixel electrode 190b overlaps a coupling electrode 176 connected to the first pixel electrode 190a to be electromagnetically (capacitively) coupled therewith. The first thin film transistor TFT1 is connected to a gate line 121 transmitting scanning signals and a data line 171 transmitting image voltages and switches on or off the image signals to be supplied to the first pixel electrode 190a in response to the scanning signals. Here, the first and the second pixel electrodes 190a and 190b for a reflective LCD may not include transparent material.

In the meantime, although it is not shown in the figures, the upper panel is described now.

A black matrix for blocking light leakage between pixels, a plurality of red, green, and blue color filters, and a common electrode preferably made of transparent conductive material such as ITO and IZO for generating an electric field along with the pixel electrodes 190a and 190b are formed a surface of an insulating substrate preferably made of transparent insulating material such as glass, which faces the TFT array panel. The black matrix and the color filters may be provided on the TFT array panel.

Now, a TFT array panel for an LCD according to the first embodiment is described more in detail.

A plurality of gate lines 121 and a plurality of storage electrode lines 131 extending in a transverse direction are formed on a lower insulating substrate 110.

A plurality of portions of each gate line 121 expand upward and downward to a plurality of gate electrodes 123a of first thin film transistors TFT1, and each gate lines 121 includes an end portion 125 having a large area for connection with an external circuit.

In the meantime, a gate line 121 transmitting gate signals or scanning signals to a previous pixel row has a plurality of portions forming gate electrodes 123b of second thin film transistors TFT2.

Each pixel electrode 131 includes a plurality of sets of storage electrodes 133a and 133b branched therefrom. Two storage electrodes 133a and 133b in a set of storage electrodes 133a and 133b are branched out in a longitudinal direction and extend to edges of a pixel area.

The gate lines 121 and the storage electrode lines 131 is preferably made of metal such as Al, Al alloy, Ag, Ag alloy, Cr, Ti, Ta and Mo. As shown in FIG. 2, the gate lines 121 and the storage electrode lines 131 according to this embodiment including a single layer. However, they may have a dual-layered structure including a metal layer preferably made of Cr, Mo, Ti and Ta having excellent physical and chemical characteristics and another metal layer preferably containing Al or Ag having low resistivity. The gate lines 121 ad the storage electrode lines 131 may be made of various metal or conductors other than those described above.

The gate lines 121 and the storage electrode lines 131 have inclined side surfaces and the inclination angle relative to a horizontal surface is preferably 30-80°.

A gate insulating layer 140 preferably made of silicon nitride SiNx is formed on the gate lines 121 and the storage electrode lines 131.

On the gate insulating layer 140, a plurality of the data lines 171을 비롯하여 a plurality of drain electrodes 175 of the first thin film transistors TFT1, a plurality of coupling electrodes 176, and a plurality of under-bridge metal pieces 172 are formed. Each data line 171 extends substantially in the longitudinal direction, and it includes a plurality of branches extending to the drain electrodes 175 to form source electrodes 173a of the first thin film transistors TFT1. The under-bridge metal pieces 172 are disposed on previous gate lines 121 and include a plurality portions forming drain electrodes 175b of the second thin film transistors TFT2. A plurality of source electrodes 173b of the second thin film transistors TFT2 are formed on the previous gate lines 121 and they are disposed opposite to the drain electrodes 175b of the second thin film transistors TFT2 with respect to the previous gate lines 121. The coupling electrodes 176 are connected to the drain electrodes 175a of the first thin film transistors TFT1 and disposed near the pixel areas to overlap the storage electrode lines 131.

The data lines 171, the drain electrodes 175a and 175b, the coupling electrodes 176, the source electrodes 173a and 173b, and the under-bridge metal pieces 172 are preferably made of Cr or Al like the gate lines 121, and they may include a single layer or multiple layers.

A plurality of semiconductor stripes 151 are formed under the data lines 171 and the drain electrodes 175a and they extend substantially in the longitudinal direction along the data lines 171. Each semiconductor stripe 151 preferably made of amorphous silicon has a plurality of branches extending toward the gate lines 123a, the source electrodes 173a, and the drain electrodes 175a and forming channel portions 154 of the first thin film transistors TFT1. In addition, a plurality of semiconductor islands 155 forming channel portions of the second thin film transistors TFT2 are formed on the previous gate lines 121.

A plurality of ohmic contacts 161 are disposed between the semiconductors 151 and the data lines 171 and the drain electrodes 175a for reducing the contact resistance therebetween. The ohmic contacts 161 are preferably made of silicide or amorphous silicon heavily doped with n type impurity. The ohmic contacts 161 include a plurality of ohmic contacts 163a and 165a for the first thin film transistors TFT1 disposed under the source electrodes 173a and the drain electrodes 175a, and a plurality of ohmic contacts 163b and 165b for the second thin film transistors TFT2 are formed under the source electrodes 173b and the drain electrodes 175b of the second thin film transistors TFT2.

A passivation layer 180 made of an inorganic insulator such as silicon nitride or an organic insulator such as resin is formed on the data lines 171, the drain electrodes 175a and 175b, the coupling electrodes 176, and the under-bridge metal pieces 172.

The passivation layer 180 has a plurality of contact holes 181a, 181b and 183 exposing at least a portion of the drain electrodes 175a and 175b and the end portions 179 of the data lines 171, respectively. In addition, a plurality of contact holes 182, 184 and 185 exposing the end portions 125 of the gate lines 121 and portions of the storage electrode lines 131, respectively, penetrate the gate insulating layer 140 and the passivation layer 180. In addition, the passivation layer 180 has a plurality of contact holes 186 exposing the source electrodes of the second thin film transistors TFT2.

A plurality of pixel electrodes the pixel electrodes 190a and 190b, a plurality of contact assistants 95 and 97, and a plurality of storage bridges 91 are formed on the passivation layer 180. The pixel electrodes 190a and 190b, the contact assistants 95 and 97, and the storage bridges 91 is preferably made of a transparent conductor such as ITO (indium tin oxide) and IZO (indium zinc oxide) or an opaque conductor such as Al having excellent light reflectance.

The pixel electrodes 190a and 190b includes first pixel electrodes 190a and second pixel electrodes 190b. The first pixel electrodes 190a are connected to the drain electrodes 175a of the first thin film transistors TFT1 through the contact holes 181a, and the second pixel electrodes 190b are connected to the drain electrodes 175b of the second thin film transistors TFT2 through the contact holes 181b and overlap the coupling electrodes 176. Accordingly, the second pixel electrodes 190b are electromagnetically (capacitively) coupled to the first pixel electrodes 190a.

The storage bridges 91 connect two storage electrode lines 131 disposed opposite each other with respect to the gate lines 121. The storage bridges 91 contact the storage electrodes 133a and the storage electrode lines 131 through the contact holes 184 and 185 penetrating the passivation layer 180 and the gate insulating layer 140. The storage bridges 91 are connected to the under-bridge metal pieces 172 through the contact holes 186. Accordingly, when the second thin film transistors operate responsive to gate-on signals applied to the previous gate lines 121, the second pixel electrodes 190b are supplied with a common voltage or a reference voltage applied to the storage electrode lines 131. The storage bridges 91 electrically connect all the storage electrode lines 131 on the lower substrate 110. The storage electrode lines 131 are used for repairing the defects in the gate lines 121 or the data lines 171, if necessary, and the under-bridge metal pieces 172 enhance the electrical connection between the gate lines 121 and the storage bridges 91 when a laser beam is illuminated for repairing.

The contact assistants 95 and 97 are connected to the end portions 125 of the gate lines 121 and the end portions 179 of the data lines 171 through the contact holes 182 and 183, respectively.

In the above-described LCD, the first pixel electrodes 190a receive the image signal voltages through the first thin film transistors TFT1, while the second pixel electrodes 190b have changing voltages dependent on the capacitive coupling with the storage electrode lines 131. Therefore, absolute values of the voltages of the second pixel electrodes 190b are always higher than those of the first pixel electrodes 190a. In this way, two pixel electrodes disposed in a pixel area but having different voltages compensate their voltages to reduce the distortion of a gamma curve.

Then, a reason why the voltage of a second pixel electrode 190b is maintained higher than that of a first pixel electrode 190a is described with reference to FIG. 3.

In FIG. 3, $C_{LCA}$ indicates a liquid crystal capacitance between a first pixel electrode 190a and a common electrode of an opposite panel, and $C_{STA}$ indicates a storage capacitance between the first pixel electrode 190a and a storage electrode line 131. $C_{LCB}$ indicates a liquid crystal capacitance between a second pixel electrode 190b and the common electrode of the opposite panel, $C_{STB}$ indicates a storage capacitance between the second pixel electrode 190b and the storage electrode line 131, and $C_{CPB}$ indicates a coupling capacitance between a coupling electrode 176 and the second pixel electrode 190b.

The voltage of the first pixel electrode 190a with respect to a common voltage or a reference voltage applied to the common electrode of the opposite panel is denoted by Va(Vd1), and the voltage of the second pixel electrode 190b is denoted by Vb. The voltage distribution law results in:

$$Vb \approx 1/(C_1+2C_2) \times [(2-C_3/C_2) \times (C_1+C_2) \times Vd1].$$

The voltage Vb can be controlled such that the voltage Vb approaches the voltage Va but always higher than the voltage Va by adjusting the capacitances. Here, $C_1=C_{LCA}+C_{STA}$, $C_2=C_{CPB}$, and $C_3=C_{LCB}+C_{STB}$. A parasitic capacitance between a gate electrode and a source electrode is neglected since it is trivial.

The arrangements of the first or the second thin film transistor TFT1 or TFT2 or the connection between the first and the second pixel electrodes 190a and 190b can be variously modified, which will be described in second to seventh embodiments.

Hereinafter, only the features distinguished from the first embodiment will be described and remaining features that is the same as those of the first embodiment will be omitted.

Figure 4:
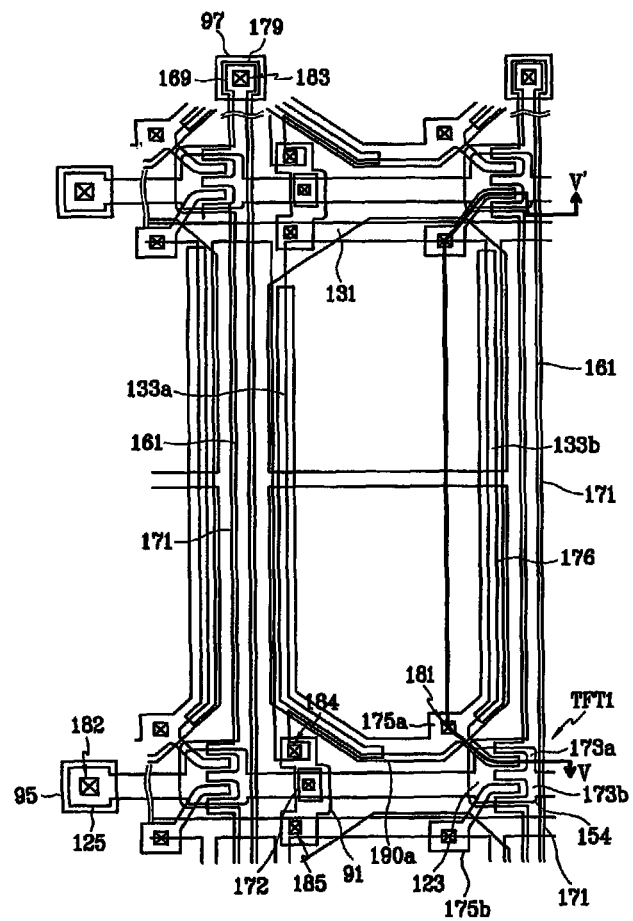
FIG. 4 is a layout view of a TFT array panel for an LCD according to the second embodiment of the present invention.
Figure 5:
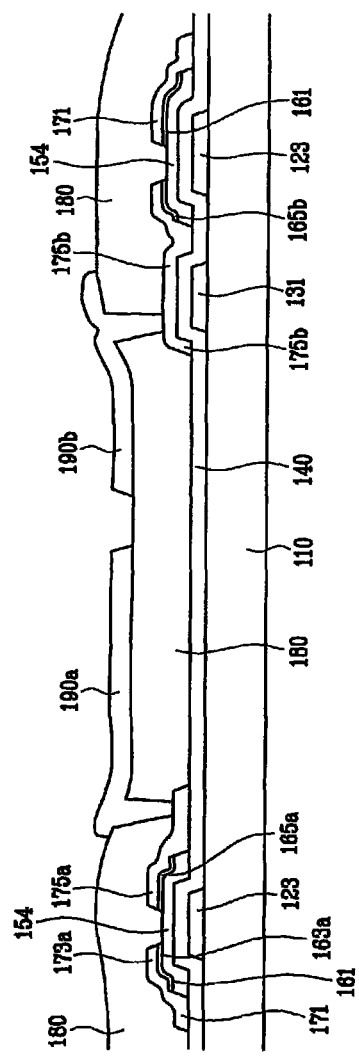
FIG. 5 is a sectional view of the ITT array panel shown in FIG. 4 taken along the line V-V'.
Figure 6:
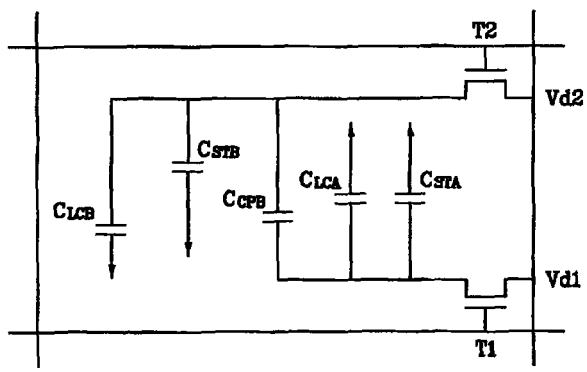
FIG. 6 is an equivalent circuit diagram of an LCD according to the second embodiment of the present invention.

FIG. 4 is a layout view of a TFT array panel for an LCD according to the second embodiment of the present invention, FIG. 5 is a sectional view of the TFT array panel shown in FIG. 4 taken along the line V-V', and FIG. 6 is an equivalent circuit diagram of an LCD according to the second embodiment of the present invention.

In the TFT array panel for an LCD according to the second embodiment, a second thin film transistor TFT2 is driven though a previous gate line 121 like the first embodiment, but it owns a gate electrode 123 commonly with a first thin film transistor TFT1 and the first and the second thin film transistors TFT1 and TFT2 are disposed opposite with respect to a gate line 121. A source electrode 173b of the second thin film transistor TFT2 and a source electrode 173a of the first thin film transistor TFT1 extend from a data line 171, a drain electrode 175b of the second thin film transistor TFT2 extends opposite a drain electrode 175a of the first thin film transistor TFT1 with respect to the gate electrode 123.

In the TFT array panel for an LCD according to the second embodiment of the present invention, although a second pixel electrode 190b is initially supplied with a pixel voltage supplied with a first pixel electrode 190a of a previous pixel row, it is supplied with a voltage Vb close to a voltage Va(Vd1) of the first pixel electrode 190a when the pixels in a corresponding pixel row are driven since it is capacitively coupled with the first pixel electrode 190a. The voltage Vb is given from the voltage distribution law by:

$$Vb \approx 1/(C_1+2C_2) \times [(2-C_3/C_2) \times (C_1+C_2) \times Vd1 + (C_1+C_3)Vd2].$$

The voltage Vb can be controlled such that the voltage Vb approaches the voltage Va but always higher than the voltage Va by adjusting the capacitances and the TFT array panel according to the second embodiment of the present invention is preferably subject to column inversion therefor. Here, the voltage Vd2 is the voltage initially supplied to the second pixel electrode 190b when the second thin film transistor TFT2 turns on.

The first and the second embodiments according to the present invention the second relates to the control of an effective driving voltage supplied to the pixel electrode 190b. However, the TFT array panel may be modified such that the first pixel electrode 190a is supplied with a voltage lower than a driving voltage transmitted by a data line, while the second pixel electrode 190b is supplied with a voltage higher than the driving voltage, which will be described in detail with reference to the figures.

Figure 7:
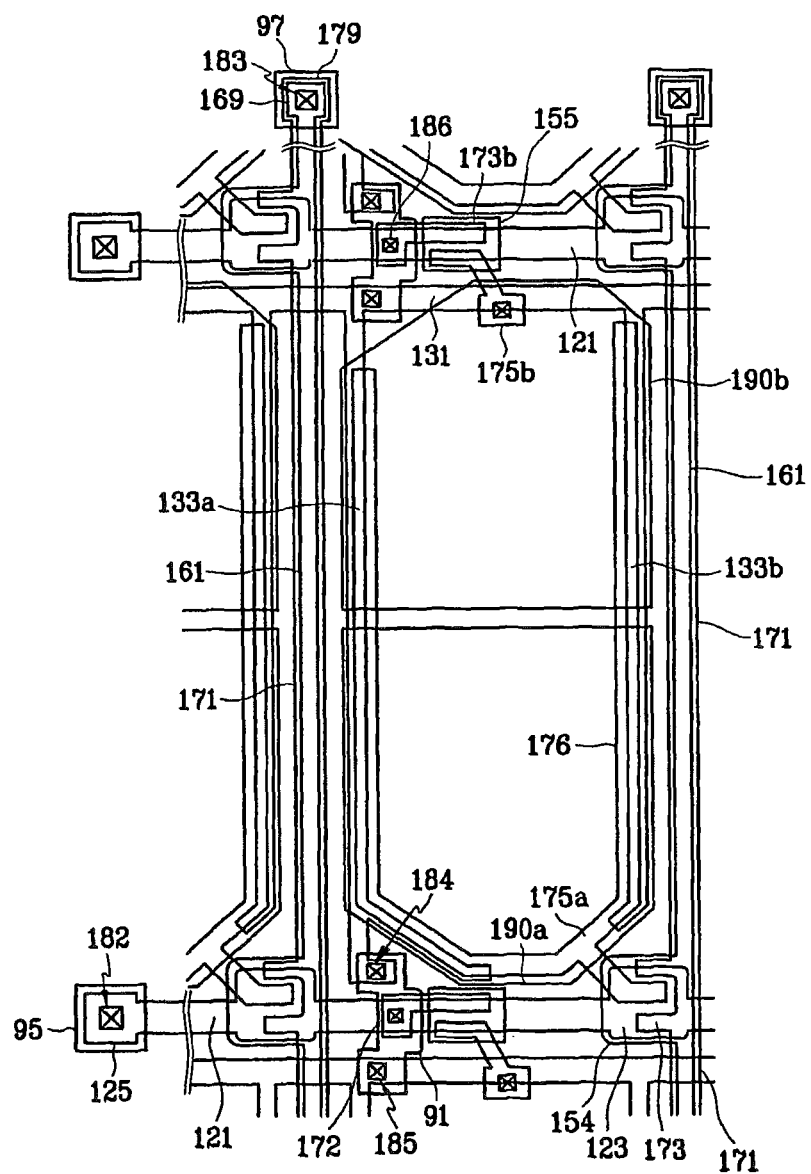
FIG. 7 is a layout view of an LCD according to the third embodiment of the present invention.
Figure 8:
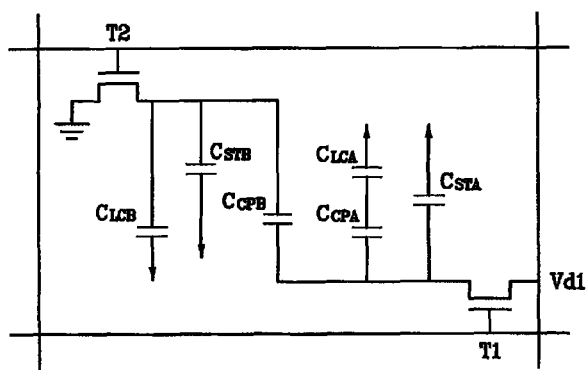
FIG. 8 is an equivalent circuit diagram of an LCD according to the third embodiment of the present invention.

FIG. 7 is a layout view of an LCD according to the third embodiment of the present invention and FIG. 8 is an equivalent circuit diagram of an LCD according to the third embodiment of the present invention.

Most of the configuration is the same as those shown in FIGS. 1 and 3.

However, a first pixel electrode 190a is not connected to a first thin film transistor TFT1 through a contact hole in a passivation layer (indicated by 180 in FIG. 2), and it overlaps a coupling electrode 176 such that it is electromagnetically (capacitively) coupled with the first thin film transistors TFT1.

In the TFT array panel for an LCD according to the third embodiment of the present invention, an effective pixel voltage supplied to a first pixel electrode 190a is smaller than a voltage Vd1 supplied through a data line 171. It is because that the first pixel electrode 190a is capacitively coupled with the coupling electrodes 176 connected to a drain electrode 175a, the effective pixel voltage Va of the first pixel electrode 190a with respect to the common voltage is given from the voltage distribution law by:

$$Va = Vd1 \times [C_{CPA}/(C_{CPA}+C_{LCB})].$$

Since $C_{CPA}/(C_{CPA}+C_{LCB})$ is always lower than one, the voltage Va is always smaller than the voltage Vd1. Here, $C_{CPA}$ indicates a coupling capacitance between the coupling electrodes 176 and the first pixel electrode 190a.

The effective driving voltage Vb supplied to the second pixel electrode 190b is determined in the same way as the first embodiment.

Figure 9:
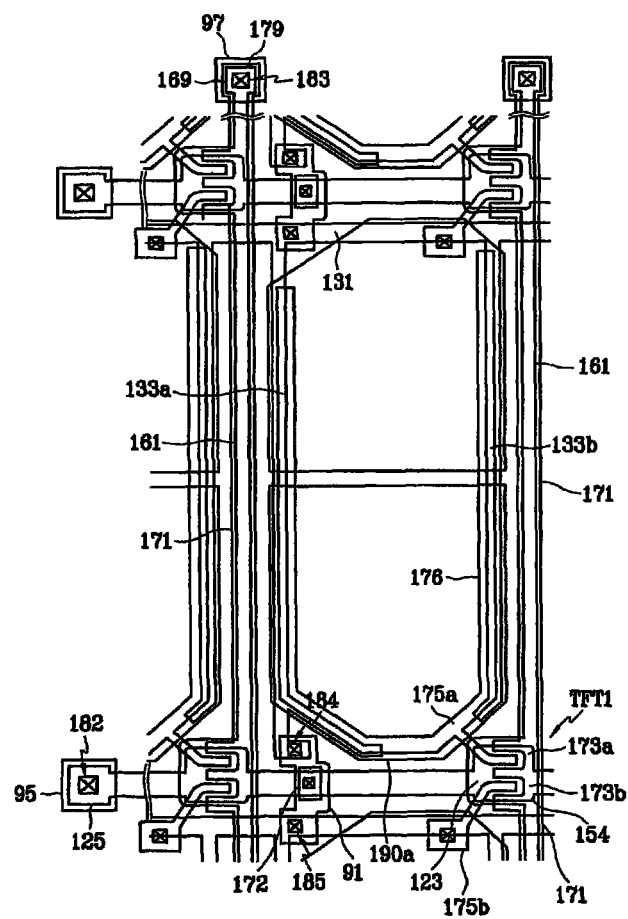
FIG. 9 is a layout view of an LCD according to the fourth embodiment of the present invention.
Figure 10:
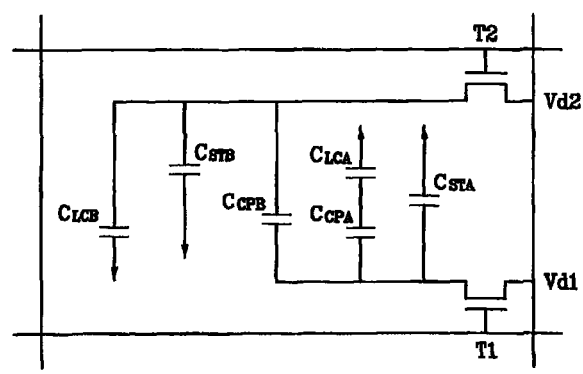
FIG. 10 is an equivalent circuit diagram of an LCD according to the fourth embodiment of the present invention.

FIG. 9 is a layout view of an LCD according to the fourth embodiment of the present invention and FIG. 10 is an equivalent circuit diagram of an LCD according to the fourth embodiment of the present invention.

Most of the configuration is the same as those shown in FIGS. 4 and 6.

However, the connection relation between first and second thin film transistors TFT1 and TFT2 and the first and the second pixel electrodes 190a and 190b is substantially the same as that shown in FIGS. 7 and 8.

In this case, an effective driving voltage Vb supplied to the first pixel electrode 190a is smaller than a voltage Vd1 transmitted by a data line 171 and an effective driving voltage Vb supplied to the second pixel electrode 190b is determined in the same way as the second embodiment.

The LCD has a major disadvantage of its narrow viewing angle, and several suggestions increasing the viewing angle for overcoming the disadvantage have been developed. Among these techniques, a method provides a plurality of cutouts or a plurality of protrusions on pixel electrodes and a common electrode opposite each other and aligns liquid crystal molecules vertical to upper and lower panels. The cutouts or the protrusions can be applied to TFT array panels according to embodiments of the present invention.

The cutouts provided both at the pixel electrodes and the common electrode give wide viewing angle by generating fringe field to adjust the tilt directions of the liquid crystal molecules.

The provision of the protrusions both on the pixel electrode and the common electrode in the lower and upper panels distorts the electric field to adjust the tilt directions of the liquid crystal molecules.

The fringe field for adjusting the tilt directions of the liquid crystal molecules to form a plurality of domains is also obtained by providing the cutouts at the pixel electrodes on the lower panel and the protrusions on the common electrode on the upper panel.

The fifth embodiment of the present invention relates to a configuration having cutouts is described in detail.

Figure 11:
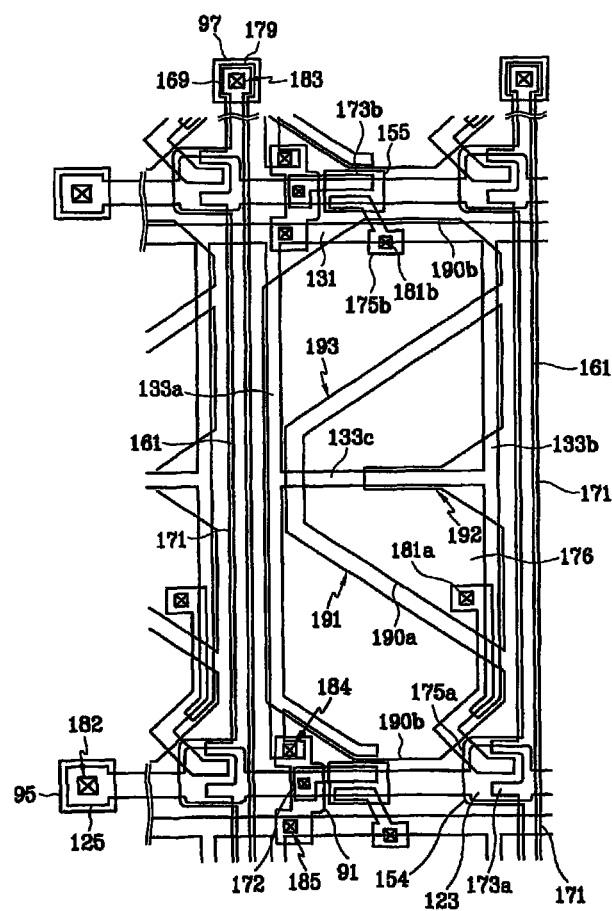
FIG. 11 is a layout view of a TFT array panel for an LCD according to the fifth embodiment of the present invention.
Figure 12:
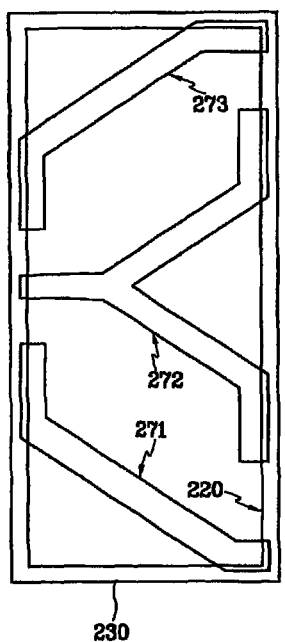
FIG. 12 is a layout view of a color filter panel for an LCD according to the fifth embodiment of the present invention.
Figure 13:
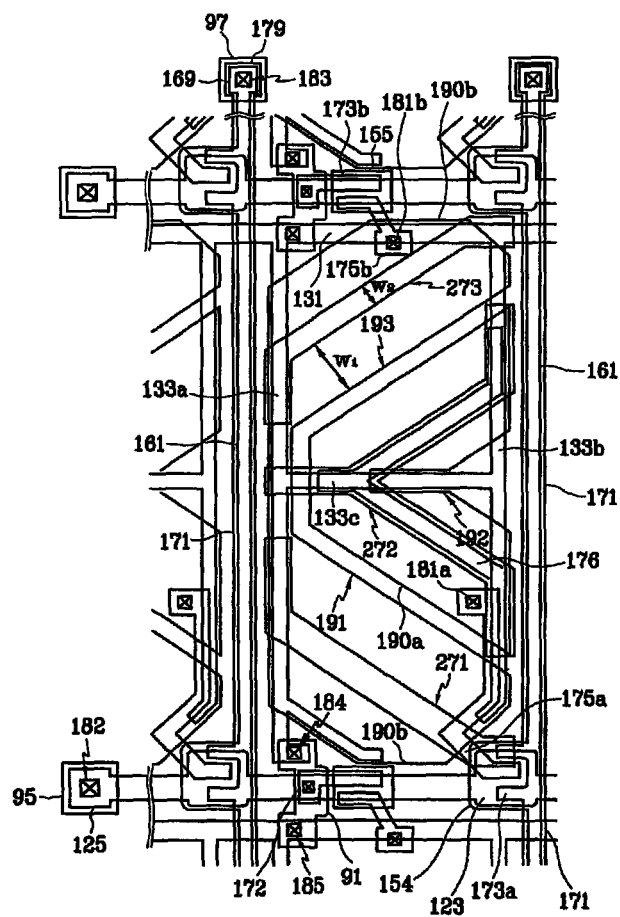
FIG. 13 is a layout view of an LCD the fifth embodiment of the present invention.
Figure 14:
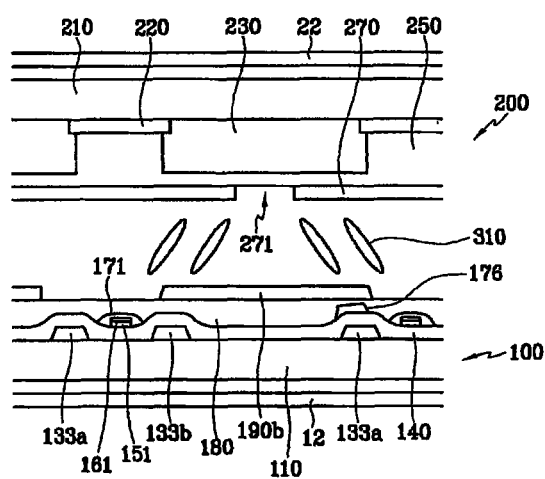
FIG. 14 is a sectional view of the LCD shown in FIG. 13 taken along the line XIV-XIV'.

FIG. 11 is a layout view of a TFT array panel for an LCD according to the fifth embodiment of the present invention, FIG. 12 is a layout view of a color filter panel for an LCD according to the fifth embodiment of the present invention, FIG. 13 is a layout view of an LCD the fifth embodiment of the present invention, and FIG. 14 is a sectional view of the LCD shown in FIG. 13 taken along the line XIV-XIV'.

An LCD according to the fifth embodiment of the present invention includes a lower panel, an upper panel facing the lower panel, and a liquid crystal layer interposed between the two panels and including liquid crystal molecules aligned vertical to surfaces of the panels.

First, the lower panel is described.

A plurality of first and second pixel electrodes 190a and 190b preferably made of transparent conductive material such as ITO (indium tin oxide) and IZO (indium zinc oxide) are formed on an insulating substrate 110 preferably made of transparent insulating material such as glass. The first and the second pixel electrodes 190a and 190b are connected to first and second thin film transistors TFT1 and TFT2, respectively, like the first embodiment. Each of the second pixel electrodes 190b overlaps a coupling electrode 176 connected to a first pixel electrode 190a to be electromagnetically (capacitively) coupled therewith. The second pixel electrode 190*b* has a cutout 192. A lower polarizing plate 12 is attached to an outer surface of the insulating substrate 110. Here, the first and the second pixel electrodes 190*a* and 190*b* for a reflective LCD may not include transparent material, and in this case, the lower polarizing plate 12 is unnecessary.

The upper panel is described now.

A black matrix 220 for blocking light leakage between pixels, a plurality of red, green, and blue color filters 230, and a common electrode 270 preferably made of transparent conductive material such as ITO and IZO are formed on an inner surface of an insulating substrate 210 preferably made of transparent insulating material such as glass. The common electrode 270 has a plurality of cutouts 271, 272 and 273. The black matrix 220 is disposed around pixel areas and it may overlap the cutouts 271, 272 and 273 of the common electrode 270 for blocking light leakage near edges of the cutouts 271, 272 and 273.

Now, a TFT array panel for an LCD according to the first embodiment is described more in detail.

A pair of a first pixel electrode 190*a* and a second pixel electrode 190*b* is divided by a gap that includes a pair of portions 191 and 193 making 45 degrees with gate line 121 and a portion perpendicular to the gate lines 121. Each of the 45-degree portions 191 and 193 is longer than the perpendicular portion. In addition, the 45-degree portions are perpendicular to each other.

A second pixel electrode 190*b* has a cutout 192 that extends from a right edge of the second pixel electrode 190*b* toward a left edge thereof and has an expanded inlet.

The first pixel electrode 190*a* and the second pixel electrode 190*b* have inversion symmetry with respect to a line that bisects a pixel area defined by intersections of the gate lines 121 and data lines 171 (and extends parallel to the gate lines 121).

A black matrix 220 for blocking light leakage is formed on an upper insulating substrate 210 and a plurality of red, green, and blue color filters 230 are formed on the black matrix 220. A common electrode 270, which is preferably made of transparent conductive material such as ITO and IZO and includes a plurality of sets of cutouts 271-273 are formed on the color filters 230.

A set of the cutouts 271, 272 and 273 in the common electrode 270 interpose the 45-degree portions of the gap between the pixel electrodes 190*a* and 190*b* and they include oblique portions parallel to the 45-degree portions and end portions overlapping edges of the pixel electrodes 190*a* and 190*b*. The end portions of the cutouts 271-273 include longitudinal end portions and transverse end portions.

The above-described TFT array panel and color filter panel are aligned and assembled and a liquid crystal material is injected therebetween and vertically aligned, thereby preparing a basic structure of the LCD according to an embodiment of the present.

When the TFT array panel and the color filter panel are aligned with each other, a set of the cutouts 271, 272 and 273 in the common electrode 270 partition each of the pixel electrodes 190*a* and 190*b* into a plurality of subareas, according to this embodiment, four subareas as shown in FIG. 13. As shown in FIG. 13, each subarea is elongated to have a width direction and a length direction.

Portions of a liquid crystal layer 3 disposed between the subareas of the pixel electrodes 190*a* and 190*b* and the subareas of the common electrode 270 corresponding thereto are referred to as subregions, and the subregions are classified into four kinds depending on average long-axis directions of liquid crystal molecules contained therein under the application of an electric field, which are referred to as domains.

In the meantime, although the first to the fifth embodiments connect a second pixel electrode 190*b* to a second thin film transistor TFT2, the second pixel electrode 190*b* may be connected to two thin film transistors.

Figure 15:
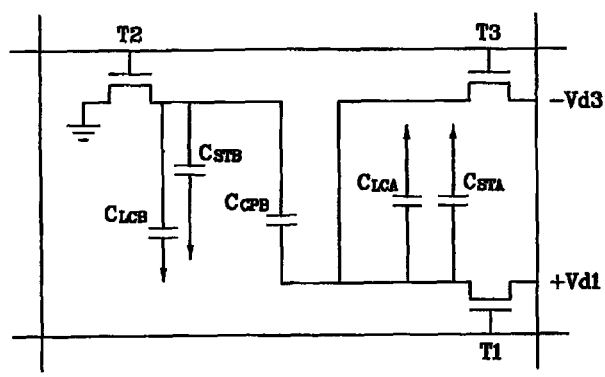
FIG. 15 is an equivalent circuit diagram of an LCD according to the sixth embodiment of the present invention.

FIG. 15 is an equivalent circuit diagram of an LCD according to the sixth embodiment of the present invention.

Referring to FIG. 15, an LCD according to the sixth embodiment of the present invention adds the second thin film transistor (TFT2 shown in FIG. 6) of the second embodiment into the connection configuration of the first embodiment as a third thin film transistor TFT3.

Figure 16:
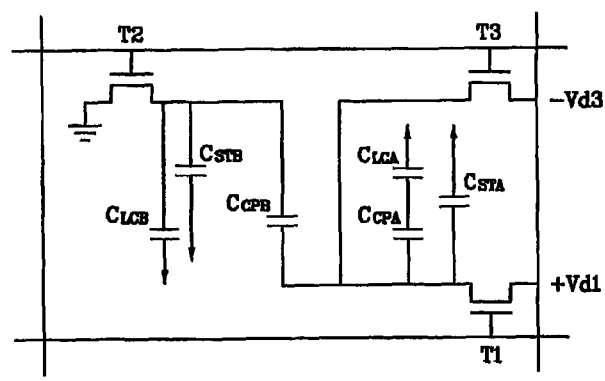
FIG. 16 is an equivalent circuit diagram of an LCD according to the seventh embodiment of the present invention.

FIG. 16 is an equivalent circuit diagram of an LCD according to the seventh embodiment of the present invention.

Referring to FIG. 16, an LCD according to the sixth embodiment of the present invention adds the second thin film transistor (TFT2 shown in FIG. 10) of the fourth embodiment into the connection configuration of the third embodiment as a third thin film transistor TFT3.

The above-described configuration improves lateral visibility of an LCD, thereby widening a viewing angle.

While the present invention has been described in detail with reference to the preferred embodiments, those skilled in the art will appreciate that various modifications and substitutions can be made thereto without departing from the spirit and scope of the present invention as set forth in the appended claims. In particular, the cutouts formed in the pixel electrodes and the common electrode have various modifications.

The invention claimed is:

1. A liquid crystal display comprising:
   a first insulating substrate;
   a gate line of a plurality of gate lines disposed on the first insulating substrate and including first and second gate electrodes;
   a gate insulating layer disposed on the gate line;
   a data line of a plurality of data lines disposed on the gate insulating layer and including a first source electrode
   a second source electrode disposed on the gate insulating layer;
   first and second drain electrodes disposed the gate insulating layer;
   a coupling electrode disposed on the gate insulating layer and extended from the first drain electrode;
   a passivation layer disposed on the data line, the first and the second drain electrodes, and the coupling electrode;
   a pixel electrode including a first subpixel electrode and a second subpixel electrode disposed on the passivation layer in one pixel area, the first subpixel electrode being connected to the first drain electrode and the second subpixel electrode being connected to the second drain electrode, one pixel area defined as an area between two gates adjacent to each other and two data lines adjacent to each other;
   a second insulating substrate facing the first insulating substrate; and
   a common electrode between the pixel electrode and the second insulating substrate, and
   wherein the first subpixel electrode, the second subpixel electrode, the first drain electrode and the second drain electrode are disposed in the one pixel area, and wherein the coupling electrode extends along edges of the first subpixel electrode and the second subpixel electrode and the edges overlapping the coupling electrode parallel the data line.

2. The liquid crystal display of claim 1, further comprising:
a storage electrode line, and
wherein the second source electrode is connected to the storage electrode line.

3. The liquid crystal display of claim 2, wherein the coupling electrode is overlapped with the storage electrode line.

4. The liquid crystal display of claim 2, further comprising:
a third gate electrode connected to the gate line, a third source electrode connected to the data line, and the third drain electrode connected to the second subpixel electrode.

5. The liquid crystal display of claim 1, wherein the first subpixel electrode is connected to or overlaps the first drain electrode and the coupling electrode, and the second subpixel electrode is connected to the second drain electrode and overlaps the coupling electrode.

6. The liquid crystal display of claim 5, wherein the first drain electrode is connected to the coupling electrode.

7. The liquid crystal display of claim 5, wherein the coupling electrode is connected to the first subpixel electrode through a contact hole at the passivation layer.

8. The liquid crystal display of claim 2, wherein the storage electrode line is capacitively coupled with at least one of the first subpixel electrode and the second subpixel electrode.

9. A liquid crystal display comprising:
a first insulating substrate;
a gate line disposed on the first insulating substrate and including first and second gate electrodes;
a gate insulating layer disposed on the gate line;
a data line disposed on the gate insulating layer and including a first source electrode
a second source electrode disposed on the gate insulating layer;
first and second drain electrodes disposed on the gate insulating layer;
a coupling electrode disposed on the gate insulating layer and extended from the first drain electrode;
a passivation layer disposed on the data line, the first and the second drain electrodes, and the coupling electrode;
a pixel electrode including a first subpixel electrode and a second subpixel electrode disposed on the passivation layer, the first subpixel electrode being connected to the first drain electrode and the second subpixel electrode being connected to the second drain electrode;
a second insulating substrate facing the first insulating substrate; and
a common electrode between the pixel electrode and the second insulating substrate,
wherein the first subpixel electrode and the second subpixel electrode are separated from each other and the gate line is disposed between the first subpixel electrode and the second subpixel electrode in a plan view,
wherein the first subpixel electrode and the second subpixel electrode are connected to the gate line,
wherein the first subpixel electrode is connected to the coupling electrode and the second subpixel electrode overlaps another coupling electrode, and
wherein the coupling electrode extends along edges of the first subpixel electrode and the edges overlapping the coupling electrode parallel the data line.

10. The liquid crystal display of claim 9, further comprising:
a storage electrode line, and
wherein the second source electrode is connected to the storage electrode line.

11. The liquid crystal display of claim 10, wherein the coupling electrode is overlapped with the storage electrode line.

12. The liquid crystal display of claim 10, further comprising:
a third gate electrode connected to the gate line, a third source electrode connected to the data line, and the third drain electrode connected to the second subpixel electrode.

13. The liquid crystal display of claim 9, wherein the first subpixel electrode is connected to or overlaps the first drain electrode and the coupling electrode, and the second subpixel electrode is connected to the second drain electrode and overlaps another coupling electrode.

14. The liquid crystal display of claim 13, wherein the first drain electrode is connected to the coupling electrode.

15. The liquid crystal display of claim 13, wherein the coupling electrode is connected to the first subpixel electrode through a contact hole at the passivation layer.

16. The liquid crystal display of claim 10, wherein the storage electrode line is capacitively coupled with at least one of the first subpixel electrode and the second subpixel electrode.

* * * * *